UNITED STATES PATENT OFFICE.

WALTER F. SMITH, OF PHILADELPHIA, PENNSYLVANIA, ASSIGNOR TO THE UNITED ELECTRIC IMPROVEMENT COMPANY, OF GLOUCESTER CITY, NEW JERSEY.

COMPOSITION FOR SUPPORTS FOR SECONDARY-BATTERY ELECTRODES.

SPECIFICATION forming part of Letters Patent No. 427,710, dated May 13, 1890.

Application filed September 10, 1889. Serial No. 323,544. (No model.)

*To all whom it may concern:*

Be it known that I, WALTER F. SMITH, a citizen of the United States, residing at the city of Philadelphia, in the county of Philadelphia and State of Pennsylvania, have invented certain new and useful Improvements in Secondary Batteries, of which the following is a specification.

Heretofore the plates or elements of secondary batteries or electro-chemical accumulators have generally been supported in frames composed of lead; but when lead alone is used the frames or supports invariably oxidize, corrode, or partially form into an objectionable peroxide during the formation of the spongy material of the plates or elements and continue to form upon the frames or supports during the charging and discharging of the battery, and finally disintegrating or falling off in particles or flakes, causing local action to set in and the battery in a brief period of time to be short-circuited.

The principal object of my present invention is to provide a frame to constitute a support for a battery plate or element of a durable composition or material of good electrical conductivity, and such as will prevent injurious oxidation or partial formation of the structure into an objectionable peroxide and of local action of the battery setting in, which, as is well understood, causes the battery in a brief period of time to be short-circuited.

My invention consists of a frame or support formed of an amalgam for a battery plate or element composed of active material or material to become active.

My invention further consists of the method hereinafter described of making an amalgam to form a support for a battery plate or element, or a device for connecting one battery with another.

A convenient method of carrying out my invention is as follows: A certain quantity of mercury (Hg) is made the cathode of a cell and metallic lead (Pb) the anode thereof, and these anodes and cathodes are immersed in a suitable dilute solution, as nitrate of lead, to constitute the electrolyte thereof. A current of electricity is then caused to pass through the electrolytic cell, and the ensuing electrolysis allowed to continue until the mercury has saturated or permeated a large proportion of the lead. The amalgam thus formed is then placed in a suitable straining appliance and the nitrate of lead removed by washing and the excess of mercury strained off, thereby leaving the mass in a plastic condition suitable for combining with molten lead or other material for various purposes in connection with electric batteries.

The amalgam of lead may be prepared by fusing the lead and then introducing a certain percentage, by weight, of mercury into the same and allowing the fused mass to cool and then washing and treating the compound as above or in any other preferred manner.

In practice it has been found that four (4) per cent., more or less, of the amalgam introduced into the lead, either by the fusion of them together or in any other preferred manner, and then casting the mixture into frames or supports, gives excellent results and prevents the injurious oxidation or partial formation of the frames or supports into an objectionable peroxide, as above mentioned, during the various stages to which such frames or supports must necessarily be subjected in the formation of the plates or elements of the battery. Then again in practice the conductivity and durability of devices for connecting one battery with another made of the aforesaid composition of matter is materially enhanced and excellent results obtained in the use of devices made thereof.

I am aware that prior to my invention it has been proposed to form a support of an alloy of lead, antimony, and mercury for a battery-plate in which the active matter thereof, consisting of metallic salts, was applied to the plate after the same had been formed; but I am not aware that a battery-plate has been provided with a frame formed of an amalgam consisting of lead and mercury, by which an inoxidizable and ductile support or frame is obtained and especially adapted for surrounding an element of a secondary battery, in order to allow the same to freely expand without fear of its bursting or of its being injured in any manner.

Having thus described the nature and objects of my invention, what I claim as new, and desire to secure by Letters Patent, is—

In combination, a battery plate or element composed of active material or material to become active and a support or frame therefor formed of an amalgam consisting of lead and mercury, substantially as and for the purposes described.

In witness whereof I have hereunto set my signature in the presence of two subscribing witnesses.

WALTER F. SMITH.

Witnesses:
GEO. W. REED,
HERMANN BORMANN.